(12) United States Patent
Kaufmann

(10) Patent No.: US 9,009,131 B1
(45) Date of Patent: Apr. 14, 2015

(54) MULTI STAGE NON-BOOLEAN SEARCH ENGINE

(71) Applicant: Garry Carl Kaufmann, Port Charlotte, FL (US)

(72) Inventor: Garry Carl Kaufmann, Port Charlotte, FL (US)

( * ) Notice: Subject to any disclaimer, the term of this patent is extended or adjusted under 35 U.S.C. 154(b) by 0 days.

(21) Appl. No.: 14/248,552

(22) Filed: Apr. 9, 2014

Related U.S. Application Data

(63) Continuation of application No. 13/955,489, filed on Jul. 31, 2013, now abandoned.

(51) Int. Cl.
*G06F 17/30* (2006.01)

(52) U.S. Cl.
CPC ............................. *G06F 17/30864* (2013.01)

(58) Field of Classification Search
None
See application file for complete search history.

(56) References Cited

U.S. PATENT DOCUMENTS

| 8,321,410 | B1* | 11/2012 | Bharat et al. ................... 707/728 |
| 2003/0115187 | A1* | 6/2003 | Bode et al. ........................ 707/3 |
| 2011/0270843 | A1* | 11/2011 | Albin ............................. 707/741 |

* cited by examiner

*Primary Examiner* — Jay Morrison

(57) ABSTRACT

A system, method and computer program product for a search engine utilizing a large number of key words or phrases, and having the search engine program, in an initial search, individually search each of the key words through an initial database. Documents found as a result of each individual key word search are placed in a smaller more relevant database, after eliminating duplicate documents. Each document will contain at least one of the key words being searched. In a secondary search the remainder of the key words are searched through each document in the smaller more relevant database. The search engine notes the occurrence of any key word in each document without regard to frequency of occurrence. A relevancy factor for each document is determined based on the percentage of the total individual key words, disregarding frequency, that appear in each document. The cumulative total of key word appearances for all key words in each document is then determined. A ranking number is calculated as the product of each documents total cumulative key word count and its relevancy factor. The results progressing from highest to lowest ranking number are returned to the searcher.

21 Claims, 5 Drawing Sheets

Figure 4

| Document | W1 | W2 | W3 | W4 | W5 | W6 | W7 | W8 | W9 | W10 |
|---|---|---|---|---|---|---|---|---|---|---|
| Doc 1 | 1 | 1 | 0 | 0 | 1 | 1 | 0 | 1 | 1 | 0 |
| Doc 2 | 1 | 1 | 1 | 1 | 1 | 1 | 1 | 1 | 1 | 1 |
| Doc 3 | 0 | 1 | 1 | 1 | 1 | 1 | 1 | 1 | 1 | 0 |
| Doc 4 | 1 | 1 | 1 | 1 | 0 | 1 | 1 | 1 | 1 | 1 |
| Doc 5 | 1 | 0 | 1 | 1 | 1 | 1 | 0 | 1 | 0 | 1 |
| Doc 6 | 1 | 1 | 1 | 0 | 1 | 0 | 1 | 1 | 1 | 1 |

Columns W1–W10: Key Words Being Searched (402), (N) Words

Rows: (N) Documents (404)

1 = Word found in document

0 = Word not found in document

MULTI STAGE NON-BOOLEAN SEARCH ENGINE

CROSS REFERENCE TO RELATED APPLICATION

This is a continuation-in-part application of previously filed application by the same inventor hereof entitled "Multi Stage non-Boolean Search Engine" Ser. No. 13/955,489 filed Jul. 31, 2013.

BACKGROUND OF THE INVENTION

1. Field of the Invention

The present invention generally relates to Information Retrieval, and more particularly to a method and system for finding user relevant documents having high specificity and relevancy, in much greater numbers than current methodologies.

2. Discussion of the Background

The number of documents and pages of information in every field now available through Internet searches of the World Wide Web (Web) has grown to prodigious numbers. Theoretically one can find almost anything conceivable on the Web. Practically, it has become increasingly difficult to find the precise information being sought; in part because of the volume of the information, and particularly because of the limited capabilities of current search engines. Search engine inherent limitations and proneness to inaccuracy in finding what the user is searching for is a common problem. This applies to Web searches as well as to searches in smaller intranet systems used by businesses and institutions.

The most common and familiar type of search engine is a key word driven Boolean search allowing the user to submit one or more key words. The search engine then looks for these key words within the database being searched. Boolean searches because of their very nature are very restrictive, often eliminating all documents that do not contain all the key words entered. The typical Boolean search method uses the "AND" operator and has been described as an exact match method. It makes no distinction between documents where one of a string of key words is missing, and documents where all key words are missing. All documents not containing all the key words would be eliminated from search results. This eliminates documents that would contain almost all of the key words and would be very relevant if found. At other times no results are found.

If instead the "OR" operator is used in the Boolean search method and a larger number of words are employed; the number of results or hits associated with any single word or phrase is usually large and collectively would be very large. The "OR" operator expands the size of the database to be searched rather than narrowing and making the search more specific. Using both the "AND" and "OR" operators may produce results where the "AND" operator alone would give no results. However in a string of numerous key words the introduction of the "OR" operator, the results would not contain the same cohesive string of key words compared to using the "AND" operator alone. Introduction of the "OR" operator also often renders the ranking algorithms ineffective.

A further problem of Boolean searches is that of the "precision rate" vs. the "recall rate. The precision rate being the proportion of documents in the total found which are relevant; while the recall rate is the proportion of relevant documents that were actually retrieved from the database being searched. If one desires greater precision and specificity one must narrow their search. One does this by including a greater number of key words to better define the target information. However, in doing so one will exclude more and more relevant documents when using a typical Boolean search methodology. This is because if any single word is not in a document the document is eliminated. Therefore if ten words were entered in a typical Boolean search and no documents contained all ten words, but numerous documents containing nine or eight words, the Boolean search would produce no results. No results that are close, almost, or nearly, in terms of the number of key words in a document are possible in a Boolean search. The nature of Boolean logic is well suited to the 0 and one, yes or no, binary system but is incapable of dealing with finding highly probable results in a search.

Because of the exact match nature of a typical Boolean search, when no results are produced, there is no way of knowing which word or words were the cause of the failure. As a result the searcher must repeat the search possibly eliminating some words and using the "OR" operator to try to refine his search in order to produce results. This can be a lengthy and tedious process and still only produce limited results.

In addition there is the problem of synonyms. Relevant documents can easily be overlooked because the document author and the searcher use different terms to describe the same thing. Including synonyms in a Boolean search increases the chances that no results will be found since as we increase the number of words we eliminate documents not containing all words.

Using the "OR" operator the number of results becomes difficult to manage effectively because of the volume of results and the large number of irrelevant documents.

Often complex algorithms using proximity analysis, past user preferences, frequency analysis, and other methodologies are used to attempt to sort or rank the hits in a relevant order. These methods have proven to be inefficient since frequently many irrelevant documents accompany relevant documents. This is particularly true when the number of key words is not large.

As explained earlier in a Boolean system, increasing the number of key words will enhance specificity reducing irrelevant documents; but at the same time relevant documents will be eliminated. Boolean searches commonly bring up a list of relevant and irrelevant documents with widely varying degrees of relevance. There might be an extremely relevant document in the list of documents searched but because of the use of the "AND" operator it may be excluded because one of many words is missing. In a Boolean search the only means of narrowing the search to find relevant documents is through the use of the "AND" operator. There is a need for a more effective method for a user to find all or a much larger portion of relevant documents within databases being searched.

There is a great need for a search engine that can overcome these drawbacks and provide the user with results that match more accurately the information being sought.

Accordingly, in illustrative aspects of the present invention there is provided a system, method, and computer program product for a search engine utilizing a large number of key words or phrases generating a much larger number of highly relevant documents.

Still other aspects, features, and advantages of the present invention are readily apparent from the following detailed description, by illustrating a number of illustrative embodiments and implementations, including a preferred mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWING

The embodiments of the present invention are illustrated by way of example, and not by way of limitation in the Figures of the accompanying drawings and in which like reference numerals refer to similar elements and in which:

FIG. 4 is a table illustrating the process of grouping documents according to the number of key words in that document without regard to the frequency of word appearance.

DETAILED DESCRIPTION OF THE PREFERRED EMBODIMENTS

Figure 1:
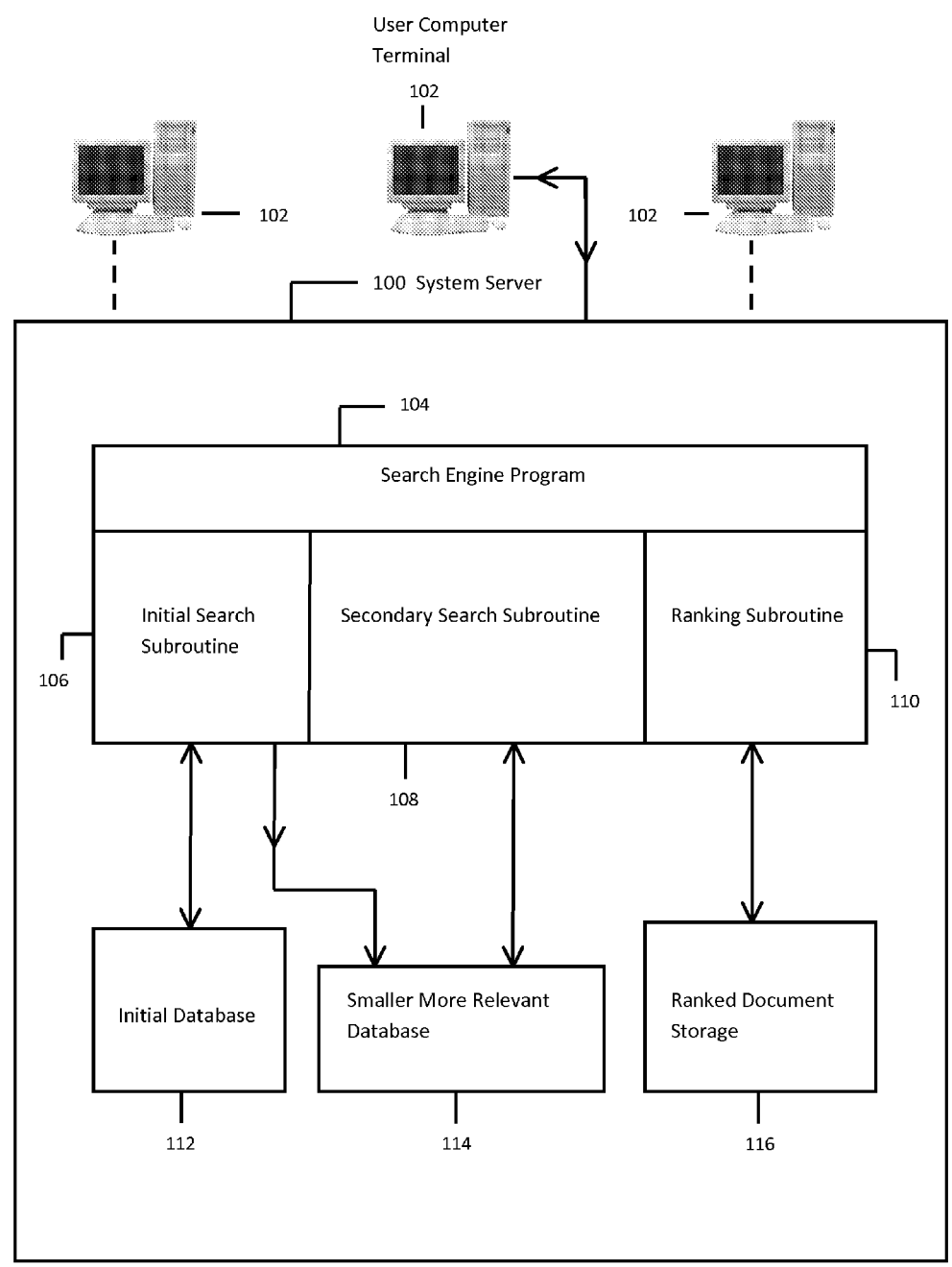
FIG. 1 is an illustration of the main systems in a multi stage non-Boolean Search Engine.

Referring now to the drawings, wherein like reference numerals designate identical or corresponding parts throughout the several views, and more particularly to FIG. 1 thereof, which shows an illustrative Multi Stage non-Boolean Search Engine Main Systems according to an illustrative embodiment. In FIG. 1

A User at a computer terminal 102 enters a multiplicity of key words, or phrases in quotation marks, into a key word list box on the computer and sends them to the System Server 100. The server of conventional design well-known in the art of computers and includes a memory and processor (neither of which is shown in the drawings), all coupled in a conventional and well-known manner. The server 100 receives the key words of a requested search query and sends them to the Search Engine Program 104, which conducts the search. The Search Engine Program 104, a collection of software, acts as an intermediary between the program subroutines 106, 108, and 110 and the hardware components, to ensure a smooth continuous and rapid search. The hardware and software components and their interaction to accomplish a completed search will now be described.

Figure 2:
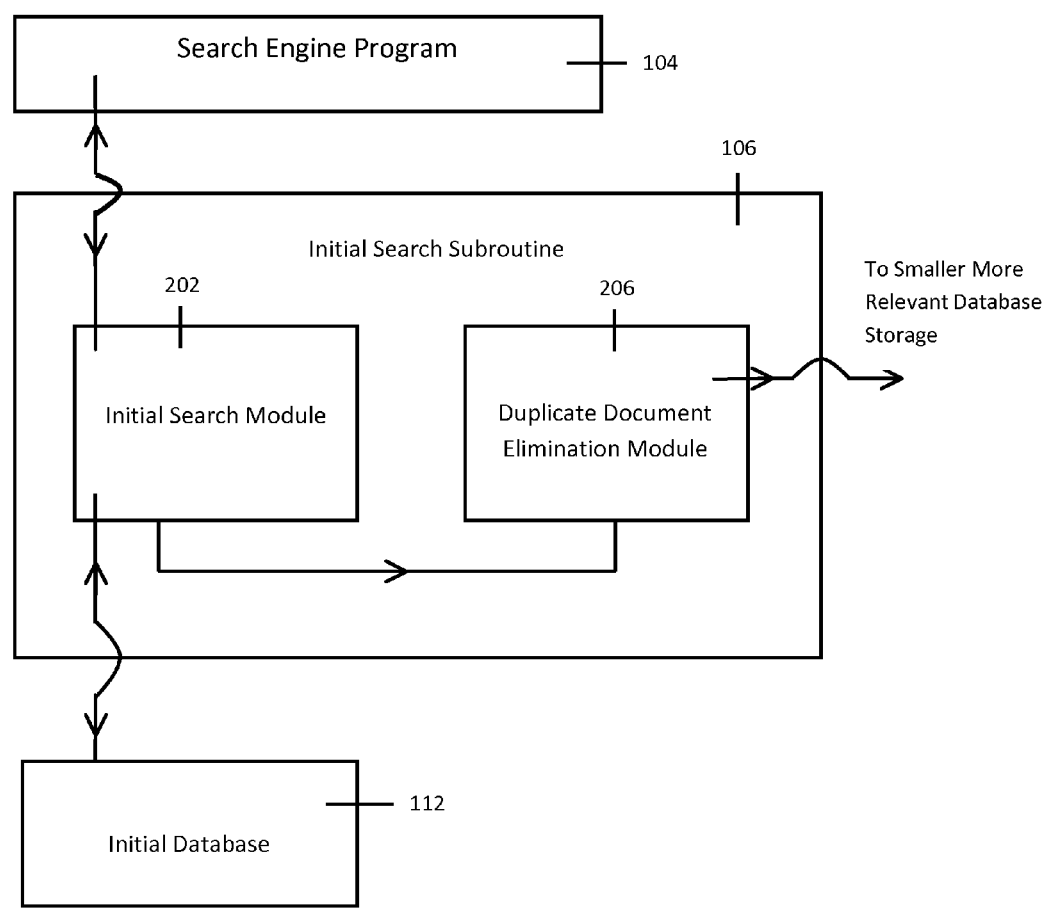
FIG. 2 is an illustration of the main steps in the first stage search.

FIG. 2 shows that the Search Engine Program 104 directs the multi word query to the Initial Search Subroutine 106. The Initial Search Module 202 enters the first key word and runs it through the Initial Database 112. This database would be the entire database of interest in an institutional setting or possibly the World Wide Web database, all of which are word based. The initial search will result in a number of hits or documents that will contain that key word or phrase. There is no attempt made to determine how frequently that word appears in any document (word count), but only if that word appears. This collection of documents associated with this first key word now has greater relevancy than most documents in the Initial Database 112 since most will not contain that word. These documents, all containing that single word then pass through a Duplicate Document Elimination Module 206. This module records each document that passes through it in connection with any multiple key word search in order to eliminate any duplicate documents. Comparing each document with the list of documents that already have passed through, it eliminates duplicates. As we search more key words through the Initial Database 112 we will find an increasing number of duplicate documents. Since we do not want to unnecessarily duplicate subsequent processing operations, duplicate documents are eliminated at this point.

When these documents are retrieved from the Initial Database 112 they may or may not be have been ranked by a ranking algorithm. Because we will be using a different method of ranking, this will occur at a much later stage, after further sorting and processing.

Figure 3:
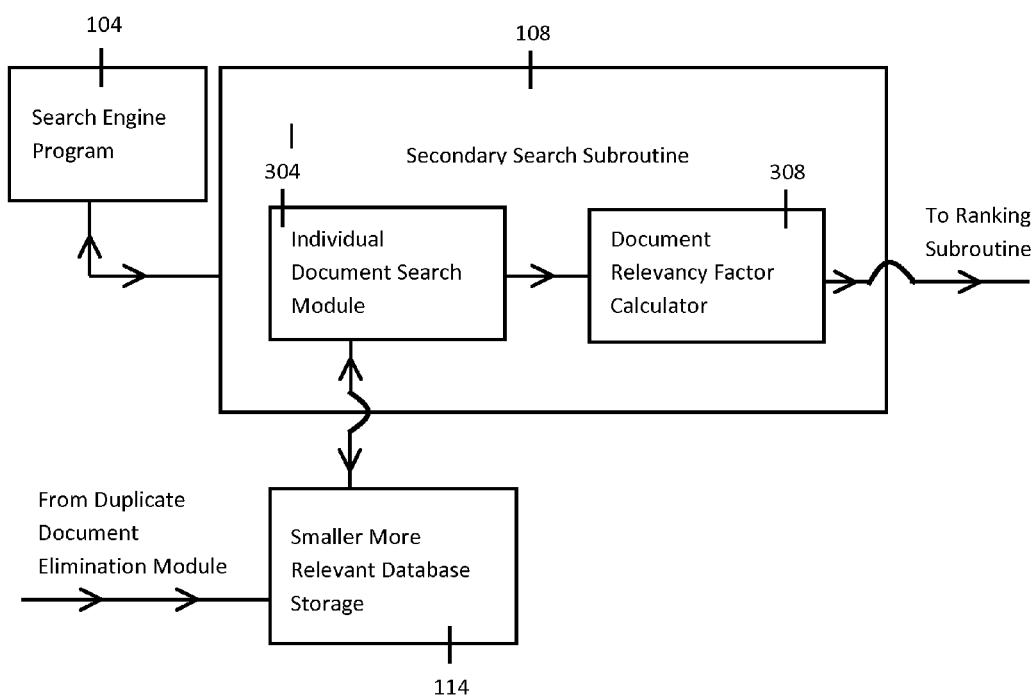
FIG. 3 is an illustration of the main steps in the secondary search.

In the next step, shown in FIG. 3, the documents from the Duplicate Document Elimination Module, all containing the first key word, are sent to the Smaller More Relevant Database Storage unit 114. We do not know if any of these documents contain any of the remaining key words, or how many individual key words, without regard to the frequency of occurrence, any document might contain.

In the next step, shown in FIG. 3, the Secondary Search Subroutine 108, takes the collection of documents containing the first single key word or phrase that are in the Smaller More Relevant Database Storage 114, and begins to run each of the remaining key words one at a time, through each document in the collection, by means of the Individual Document Search Module 304. The Individual Document Search Module 304 notes in which document each of these key words appears without regard to word count. It might for example place a 1 beside a document containing the word being searched if it appears in that document, and a 0 if the word does not appear in that document. This is demonstrated in the table of FIG. 4. The Documents 404 are listed in columns, while the Key Words Being Searched 402 through these documents are listed in rows. Taking Doc 3 as an example and looking along the row for that document we see that 2 out of the 10 key words did not appear in that document. This document contains 8 of 10 key words. Similarly Doc 2 contains all 10 key words and Doc 1 only holds 6 of the 10 key words being searched. In reality, most documents will only contain a small fraction of the key words being searched.

At this point it is necessary to elaborate on some of the ways in which we use the knowledge of how many of the individual key words being searched through each document are found in that document. In addition the mathematical significance of being able to retain and select documents containing a specific number of key words without regarding the frequency of appearance will be described. This is critical to finding a larger number of relevant documents. We will then continue from the point where each document has been searched by the Individual Document Search Module 304 and assigned a number indicating the key word content of each document disregarding frequency of occurrence.

The search process does not discard any document if a particular word fails to appear within it. So if we started with a 10 key word search, upon running each of the remaining words through each document, we could find documents with all 10 words, documents with 9 words, documents with 8 key words and so on down the line. It may be that no documents would be found containing all 10 words. This would give us no results in a Boolean search. A Boolean search would never uncover documents containing 9 or 8 of the key words.

Since the absence of a particular key word in a document does not exclude the document from subsequent key word searches, we have the opportunity of finding all or some of the remaining key words in that document. We need not fear getting no results if one or more key words are missing in a document. Thus we can include synonyms without restricting our search. Increasing the number of words does not narrow our search but rather makes it more precise; and the conflict between search precision and search recall rate vanishes. A significant benefit.

Since in a typical Boolean search any documents found must contain all the key words, then all of these documents must reside in the set of documents found when the first key word was searched through the initial database 112. The documents found, if any, would be identical no matter which of the 10 key words was entered first in a Boolean search.

Using our method and system, when the 10 key words have been searched through all the documents in the smaller more relevant database, that are associated with the first key word search of the initial database, we will have already surpassed any Boolean search using these 10 key words. Our search method would have uncovered any documents containing all 10 key words, while in addition it would have uncovered documents at the 9, 8, 7 . . . 1 key word level, many of which would be very relevant. As we search the initial database with more of the key words, we will not uncover any more documents containing all the key words, than were found on processing the first key word. We will however find increasing numbers of documents containing 9, 8, 7, etc. key words.

It also is not improbable, that 10 key words would provide no results in a Boolean search. By contrast the method and system of the present invention always gives the most complete results achievable with the key words entered.

At this point we have been following a sequence of operations resulting from the entry of the first of a multiplicity of key words. As the resulting documents are processed and go through the steps of the disclosed method, the Search Engine Program 104 is entering the next key word for searching of the initial database. The process is continuous in nature. It could be compared to an orchestral conductor, the Search Engine Program 106, starting certain subroutine programs that have their own music (programmed instructions), and harmonizing them with one another, and their associated hardware (musical instruments) to achieve a continuous flow of music (results). Many components of the system are operating simultaneously to allow for process speed and maximum resource utilization.

We now know how many of the original 10 key words being searched, in this first set of documents, are contained in any document, based on word identity and not word count. This information can be helpful in ultimately ranking these documents. Given a circumstance where comparing two documents where the number of key words being searched is say 10; with the first document having 9 of those words appear, and the second having 7 of the key words appear; but not knowing the frequency with which these words appear (word count); one would show a preference for the document with 9 key words. It is logical and sensible that more key words in association and interaction with other key words is more significant and has greater relevancy, than a smaller number of associated key words, even when the total cumulative word count (all word appearances for each word counted and totaled) is the same.

This leads us to a method that at least in part will help to define the relevancy of any document, and will be a part of the ranking algorithm we will use, which is amplified further hereinafter.

It would seem reasonable that if a document contained all 10 key words of a search employing 10 key words in its search, that we could ascribe a 100% relevancy factor to that document. If documents contained 9 and 8 of the key words without regard to the frequency of occurrence we would ascribe a 90% and 80%, respectively, relevancy factor to those documents. This can be expressed as:

$$\text{Document Relevancy Factor} = \frac{\text{Number of Key Words in the Document Disregarding Occurrence Frequency}}{\text{Number of Key Words Employed in Search}} \times 100$$

We also know that as the number of key words being searched rises, the probability of finding all key words in a single document decreases, and the probability of finding no results in a Boolean search increases. Our single word search mechanism, identifying documents containing a single word within a document, repeated for each key word in each document, identifies documents with varying relevancy factors as described above.

If a single word is missing in a search utilizing a large number of key words, the number of possible combinations of the remaining key words appearing in a document is quite high, and very much higher if two words are missing. The formula for calculating the number of possible combinations C, of Y items in a set of N items is:

$$C = \frac{N!}{(N-Y)!(Y)!}$$

Taking our example of 10 key words being searched there is just one combination of all 10 words appearing in a document. If however one word were allowed to be missing the number of combinations that could occur with 9 of the 10 words would be:

$$C = \frac{10 x 9 x 8 x 7 x 6 x 5 x 4 x 3 x 2 x 1}{(10-9)1 \times (9 x 8 x 7 x 6 x 5 x 4 x 3 x 2 x 1}$$

$$= \frac{3,628,800}{362,880} = 10$$

Doing this calculation for 2 words missing out of 10 we would find that C the number of ways 8 out of 10 words could possibly be combined would be 45. In a 10 key word Boolean search if the search gave no results or only a few documents, in almost every instance the searcher would be more than happy to see documents containing 9 or 8 of these key words. Keep in mind that we are not talking about the frequency with which these words occur in a document, but rather only that they appear in the document. Any particular combination could have no documents or many documents associated with it. These of course are highly likely to be relevant having a relevancy factor of 90 and 80% respectively, and would all be uncovered in the search method being described. This search method virtually assures that a large number of very relevant documents will be uncovered. A typical Boolean search would uncover none of these if a single word were missing. In the event that a Boolean search involving a larger number of words found some documents our search methodology would add a large number of additional relevant documents.

Taking another example of running 15 key words where only 13 words were found in any document, our calculation would show that there are 105 different possible combinations of these 13 words that could produce documents, and have a relevancy of 87%. At the 12 key word out of 15 key word level the number of 12 key word combinations that could be found to contain one or more documents is 455. These documents would have a relevancy factor of 80%. Thus we can see that when selecting a large number of key words to be searched, the method described will find all documents found in a Boolean search, and very probably many more highly relevant documents. When a Boolean search using many key words finds no results, our search method will likely produce a large number of the most relevant documents possible with those key words.

Returning to FIG. 3; when the Individual Document Search Module 304 in FIG. 3 completes searching all key words through each of the documents passing through the Smaller More Relevant Storage unit 114, it will have identified documents containing 10, 9, 8, . . . 1 key words disregarding word frequency. Each document will have assigned to it the number of key words found in it disregarding occurrence frequency.

These documents are then sent to the Document Relevancy Factor Calculator 306 in FIG. 3. It then is a simple matter for the calculator, knowing the number of key words used in the search, and the number of words appearing in each document, to calculate each documents relevancy factor. We already have established that documents having a greater number of individual words associated with each other have a higher relevancy based on our computation. This was described earlier in our determination of a relevancy factor defined as:

$$\text{Document Relevancy Factor} = \frac{\text{Number of Key Words in the Document Disregarding Occurrence Frequency}}{\text{Number of Key Words Employed in Search}} \times 100$$

This factor gives extra weight to documents having a larger number of individual words associated with each other in a document disregarding the frequency of appearance of any word. However since the intent of each additional key word is to add specificity to the search being undertaken, it follows that relevancy should increase with the appearance of each additional key word in a document. The above relationship takes this into account. It is a particularly good relationship because when the number of key words employed is low, the impact of each key word in the final result is high; and when the number of key words is high the impact of an individual key word is lesser. It is self-regulating in terms of maintaining a good balance of the importance of an individual key word as the number of key words used in a search increases.

It also has the benefit of allowing searches of different dimensions such as key words, word roots, phrases in quotes, word order and other dimensions to be searched within this framework without problems related to ranking because finding a particular word or dimension within a document has the same weight as finding any other word or search dimension in that document. Relevancy factor for a document is only through sharing a number of search parameters or dimensions with others within that document. In our case we are dealing with key words only, but the documents in the initial database could be searched through any other search parameter.

By combining the Document Relevancy factor with a more traditional method of ranking documents, we can arrive at a superior ranking method. In this method we don't just rely on word counts, but factor in the effect of the interplay of more of the key words with each other to influence ranking. This method also discourages the loading up of a document with one or two key words to give it a high word count and have it ranked more highly.

Figure 5:
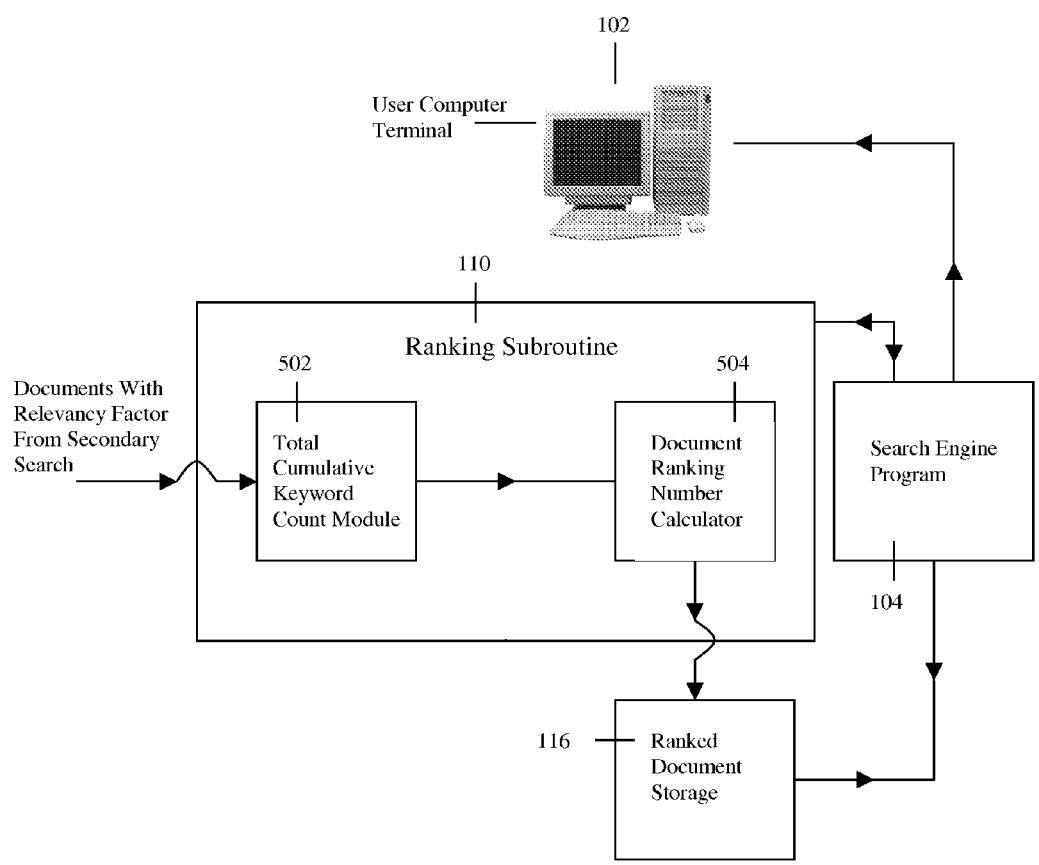
FIG. 5 is an illustration of the main steps of ranking results and returning them to the user.

Referring to FIG. 5, in the next step documents with their accompanying relevancy factor, enter the Total Cumulative Word Count Module 502 of the Ranking Subroutine 110. Here the total number of each key word in each document and the total cumulative key word count (grand total of key words) is determined for each document. The Document Ranking Number Calculator 504 using the following formula, then calculates a ranking number for each document:

Document Relevancy Factor×Document Total Cumulative Key Word Count=Ranking Number We are dealing with key words in our search method and system; but the same concept can apply to any other search dimensions, by counting the appearance of that search dimension in the document.

The higher the number the more relevant a document is considered to be. In this way documents containing the same total cumulative word count would be rated very differently depending on their respective relevancy factors. As an example if two documents both contained a total of X cumulative total word count; one having a Relevancy Factor of 90 the other a Relevancy Factor of 70, it would be necessary for the 70 factor document to contain 2/7(X) additional key words to achieve the same Ranking Number. So in a case where both documents contained a cumulative total of 49 key words it would take an additional 14 key words or 63 key words cumulative total for the 70 Relevancy Factor document to have the same Ranking Number as the document having a 90 Relevancy Factor.

In the next step the Ranking Subroutine 110 accesses the Ranked Document Storage 116 and having calculated a ranking number for each document, orders them from higher to lower number, placing them in the Ranked Document Storage 116 in order from higher to lower ranking number.

If when the initial database was searched with the first key word, some ranking algorithm may have ranked the resultant documents, it is necessary to rerank them at this time. The original ranking would be in relation to the group of documents associated with the first key word only. We need to rank our documents in relation to all the key words searched; therefore it is necessary to provide a ranking methodology that results in a meaningful ranking order as above. Other ranking methodologies might be used, but it is important and beneficial to again rank documents that have gone through a secondary search, realigning their relative importance compared with any original ranking.

We have been following the set of documents resulting from entering the first key word into the system. As these documents move through the system the Search Engine Program 104 is entering the second and subsequent words for identical processing. Many operations are occurring simultaneously in connection with the progress of the key words through the system. The Search Engine Program 104 coordinates these activities.

Once all key words have been run through the system and all documents placed in the Ranked Document Storage 116 in appropriate order, the Search Engine Program 104 transfers them to the User Computer terminal 102 in descending ranking number order, for review by the user.

There are many circumstances where it will be advisable or even desirable to alter the process described above. The process described above allows for discovering all combinations of key words in any group of documents containing those key words. This type of processing would require much more computing power and resources than would normally be needed. In virtually every case the user is only interested in documents having a high relevancy factor. The following two embodiments are more preferred for this reason, and because computing time will be reduced, and system computing resource requirements reduced.

An exemplary embodiment would be as follows:

For illustrative purposes we will assume a 10 key word search. All operations are the same except that the Duplicate Document Elimination Module 206 in FIG. 2 is relocated and placed immediately following the Individual Document Search Module 304 in FIG. 3. The reasons for this and its efficacy will be shown herein further. Thus documents from the Initial Search Module 202 will flow to the Individual Document Search Module 304 in FIG. 3 without duplicate document elimination at this point. The secondary search subroutine would be programmed to accept only documents having a relevancy factor of X or greater; where X is a number high enough to provide documents of considerable relevancy, while excluding those of lesser relevancy. Assuming a desired relevancy factor of 80 or higher it would proceed as follows:

Searching as earlier described where a 1 was given to a document if the searched word was found in that document, and a 0 if not found; in the 10 key word search described earlier 2 words could be missing and we would have documents possible at the 10, 9, and 8 word levels. As the search progressed through all the documents, and 0's and 1's are assigned to each document; as soon as any document was given three 0's in connection with the search, it would be removed from further searching. Search time will be reduced through progressive elimination of documents. The vast majority of documents will be eliminated at this point. Because only a relatively small number of documents go forward for further processing, it is reasonable to place the duplicate document elimination module after the individual document search module. Far fewer documents need to be recorded for comparison purposes with this placement. Remaining documents would all contain 10, 9, or 8 key words, and moved to the document relevancy calculator. By confining our search to the 8 to 10 key word appearance levels, we would have the high relevancy described, as well as 56 possible word combinations capable of producing results. Setting the relevancy factor to 90 still allows for 10 times as many possible word combinations in comparison with a Boolean search. It may be quite feasible to allow the user to enter the relevancy factor he desires prior to starting his search thus allowing for a broader or a more restrictive search.

All subsequent treatment would be as in the comprehensive search method described initially. Fewer computing and storage resources would be needed to search and rank these documents, than would be needed if the complete comprehensive search were employed.

Another exemplary embodiment would be as follows:

Assuming again a 10 key word search for illustrative purposes, in this embodiment only a specified number of the most relevant documents based on relevancy factor, are sent to the ranking subroutine. For example, the program could specify that once 1000 documents having a relevancy factor of 90 or greater are found in connection with searching successively each key word through the documents in the smaller more relevant database storage, see FIG. 3, all searching be terminated. In similar fashion the program could limit the number of documents with a relevancy factor of 90 or higher to 100 documents in connection with searching any individual key word. Thus the total number of documents would be the total number of key words used in a search times 100. These documents would then be moved to the ranking subroutine. Only these documents then will be ranked by the ranking subroutine and forwarded to the user, saving time and computing resources. Such a search would uncover all results found in a Boolean search and probably many more of high relevancy. It seems unlikely that a user would want to view more than this number of documents.

In another exemplary embodiment, in addition to performing the comprehensive search already described, the search engine program would also allow for the user to designate key word combinations that he or she believes are of special importance. As the normal search progressed the documents resulting from these designated key word combinations would be segregated, but otherwise processed in identical fashion to the other results. These would be presented separately to the user. In this scenario taking a circumstance where a 10 key word search is conducted but 5 of those are specified as being of particular importance, all 5 of the words would be required to be in each document. Other key words might or might not also be present. To this extent the 5 word sub search is similar to a Boolean search in terms of outcome because it requires all 5 words to be present in every document; but different in terms of the search methodology used to achieve the result. The presence of other key words will of course affect the ranking of this group of documents.

The above-described devices and subsystems of the illustrative embodiments can include, for example, any suitable servers, workstations, PCs, laptop computers, PDAs, Internet appliances, handheld devices, cellular telephones, wireless devices, other devices, and the like, capable of performing the processes of the illustrative embodiments. The devices and subsystems of the illustrative embodiments can communicate with each other using any suitable protocol and can be implemented using one or more programmed computer systems or devices.

One or more interface mechanisms can be used with the illustrative embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, a combination thereof, and the like.

It is to be understood that the devices and subsystems of the illustrative embodiments are for illustrative purposes, as many variations of the specific hardware used to implement the illustrative embodiments are possible, as will be appreciated by those skilled in the relevant art(s). For example, the functionality of one or more of the devices and subsystems of the illustrative embodiments can be implemented via one or more programmed computer systems or devices To implement such variations as well as other variations, a single computer system can be programmed to perform the special purpose functions of one or more of the devices and subsystems of the illustrative embodiments. On the other hand, two or more programmed computer systems or devices can be substituted for any one of the devices and subsystems of the illustrative embodiments. Accordingly, principles and advantages of distributed processing, such as redundancy, replication, and the like, also can be implemented, as desired, to increase the robustness and performance of the devices and subsystems of the illustrative embodiments.

The devices and subsystems of the illustrative embodiments can store information relating to various processes described herein. This information can be stored in one or more memories, such as a hard disk, optical disk, magneto-optical disk, RAM, and the like, of the devices and subsystems of the illustrative embodiments. One or more databases of the devices and subsystems of the illustrative embodiments can store the information used to implement the illustrative embodiments of the present inventions. The databases can be organized using data structures (e.g., records, tables, arrays, fields, graphs, trees, lists, and the like) included in one or more memories or storage devices listed herein. The processes described with respect to the illustrative embodiments can include appropriate data structures for storing data collected or generated by the processes of the devices and subsystems of the illustrative embodiments in one or more databases thereof.

All or a portion of the devices and subsystems of the illustrative embodiments can be conveniently implemented using one or more general purpose computer systems, microprocessors, digital signal processors, micro-controllers, and the like, programmed according to the teachings of the illustrative embodiments of the present inventions, as will be appreciated by those skilled in the computer and software arts. Appropriate software can be readily prepared by programmers of ordinary skill based on the teachings of the illustrative embodiments, as will be appreciated by those skilled in the software art. Further, the devices and sub-systems of the illustrative embodiments can be implemented on the World Wide Web. In addition, the devices and subsystems of the illustrative embodiments can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry or software.

Stored on any one or on a combination of computer readable media, the illustrative embodiments of the present invention can include software for controlling the devices and subsystems of the illustrative embodiments, for driving the devices and subsystems of the illustrative embodiments, for enabling the devices and subsystems of the illustrative embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the illustrative embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present inventions can be distributed for better performance, reliability, cost, and the like.

As stated above, the devices and subsystems of the illustrative embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

| TABLE OF REFERENCE NUMERS | |
|---|---|
| Reference Number | Name of Component |
| 100 | System Server |
| 102 | User Computer Terminal |
| 104 | Search Engine Program |
| 106 | Initial Search Subroutine |
| 108 | Secondary Search Subroutine |
| 110 | Ranking Subroutine |
| 112 | Initial Database |
| 114 | Smaller More Relevant Database Storage |
| 116 | Ranked Document Storage |
| 202 | Initial Search Module |
| 206 | Duplicate Document Elimination Module |
| 304 | Individual Document Search Module |
| 308 | Document Relevancy Factor Calculator |
| 402 | Key Words Being Searched |
| 404 | Document |
| 502 | Total Cumulative Keyword Count Module |
| 504 | Document Ranking Number Calculator |

While the present invention has been described in connection with a number of illustrative embodiments, and implementations, the present invention is not so limited, but rather covers various modifications, and equivalent arrangements, which fall within the purview of the appended claims.

What is claimed is:

1. In a computer network system an improved method running on a server of said network system for performing document searches comprising the steps of:
  (a) initiating a search in response to a user's query from an input device, said query including a multiplicity of key words, with the words being searched one at a time through a word-indexed database;
  (b) eliminating duplicate documents from the results received from said search and sending these results to a smaller more relevant database;
  (c) initiating a secondary search of every document in said smaller more relevant database associated with the first of the multiplicity of key words, by means of searching the remaining key words through each document and noting in which document each key word appears, without regard to frequency of appearance; resulting in all combinations of key words in any document being identified and each document assigned a number indicating the number of key word appearances;
  (d) calculating a document relevancy factor as the percentage of key words appearing in each document as the number of key words found in the document disregarding word appearance frequency, divided by the number of key words employed in the search, times one hundred;
  (e) calculating a ranking number for each document that is the resultant of the total cumulative word count for all key words in the document multiplied by the document's relevancy factor, with higher numbers taking precedence over lower numbers;

(f) repeating steps (a) through (e) above for the remaining words of said query; and, (g) sending the results back to the user.

2. The method of claim 1 further including the step of simultaneously performing steps (a) through (e) continuously as the server processes step (a) for the next succeeding word of the multiplicity of key words of the query.

3. The method of claim 1 further including in response to pre-programming the step of capping the maximum number of documents resulting from any single word search of the initial database.

4. The method of claim 1 further including the step of performing duplicate document elimination after step (c) and before step (d) in lieu of performing duplicate document elimination in step (a) above.

5. The method of claim 1 in response to pre-programming the step of setting a document relevancy factor below which documents will be excluded from further processing.

6. The method of claim 1 in response to pre-programming the step of allowing a user to set a document relevancy factor below which documents will be excluded from further processing.

7. The method of claim 1 in response to pre-programming the step of allowing a user to designate preferred key word combinations and having documents containing said combinations segregated during performance of the steps of the search method, subsequently subjecting said documents to the same method steps as all other documents, and separately presenting this group of documents to the user.

8. A system comprising:
(a) server connected to a network, the server including:
(a) at least one processor; and,
(b) a memory operatively coupled to said at least one processor, the memory storing program instructions that when executed by the at least one processor, cause the at least one processor to:
(i) initiate a search of word-indexed database, one word at a time;
(ii) pass the results of the first-word search through a duplicate document elimination module in order to eliminate duplicate documents;
(iii) store the results of the first word search in a smaller more relevant database organized in said memory of said server;
(iv) search every document in said smaller more relevant database associated with the first of the multiplicity of key words, by means of searching the remaining key words through each document and noting in which document each key word appears, without regard to frequency of appearance; resulting in all combinations of key words in any document being identified and each document assigned a number indicating the number of key word appearances;
(v) calculate a document relevancy factor as the percentage of key words appearing in each document as the number of key words found in the document disregarding word appearance frequency, divided by the number of key words employed in the search, time one hundred;
(vi) calculate a ranking number for each document that is the resultant of the total cumulative word count for all key words in the document multiplied by the documents relevancy factor, with higher numbers taking precedence over lower numbers;
(vii) repeat steps (i) through (vi) for the remaining words of said query; and,
(viii) sending these results back to the user.

9. The system of claim 8 wherein said processor simultaneously performing steps (vii) continuously as the server processes step (i) for the next succeeding word of the multiplicity of key words of the query.

10. The system of claim 8 further including in response to pre-programming the step of capping the maximum number of documents resulting from a single word search of the initial database.

11. The system of claim 8 further including the step of performing duplicate document elimination after step (iv) and before step (v) in lieu of performing duplicate document elimination in step (ii) above.

12. The system of claim 8 further including in response to pre-programming, the step of designating a document relevancy factor below which documents will be excluded from further processing.

13. The system of claim 8 in response to pre-programming, the step of allowing a user to designate a document relevancy factor below which documents will be excluded from further processing.

14. The system of claim 8 in response to pre-programming, the step of allowing a user to designate preferred key word combinations and having documents containing said combinations segregated during performance of the steps of the search method, subsequently subjecting said documents to the same method steps as all other documents, and separately presenting this group of documents to the user.

15. A non-transitory computer readable medium, comprising: a plurality of computer-executable instructions, which, when executed by a computer, causes the computer to:
(a) receive a search query from a user,
(b) initiate a search of a word-indexed database, one word at a time and receive information identifying documents selected in response to said search query;
(c) pass the results of the first-word search through a duplicate document elimination module in order to eliminate duplicate documents;
(d) store the results of the first word search in a smaller more relevant database organized in said memory of said server;
(e) search every document in said smaller more relevant database associated with the first of the multiplicity of key words, by means of searching the remaining key words through each document and noting in which document each key word appears, without regard to frequency of appearance; resulting in all combinations of key words in any document being identified and each document assigned a number indicating the number of key word appearances;
(f) calculate a document relevancy factor as the percentage of key words appearing in each document as the number of key words found in the document disregarding word appearance frequency, divided by the number of key words employed in the search, times one hundred;
(g) calculate a ranking number for each document that is the resultant of the total cumulative word count for all key words in the document multiplied by the document's relevancy factor, with higher numbers taking precedence over lower numbers;
(h) repeat (a) through (g) for the remaining words of said query; and,
(i) send the results back to the user.

16. The non-transitory computer readable medium of claim 15 wherein said processor simultaneously performing steps (c) through (g) as the server processes step (b) for the next succeeding word of the multiplicity of key words of the query.

17. The non-transitory computer readable medium of claim 15 further including in response to pre-programming the step of capping the maximum number of documents resulting from a single word search of the initial database.

18. The non transitory computer readable medium of claim 15 further including the step of performing duplicate document elimination after step (e) and before step (f) in lieu of performing duplicate document elimination in step (c) above.

19. The non-transitory computer readable medium in response to pre-programming further including the step of designating a document relevancy factor below which documents will be excluded from further processing.

20. The non-transitory computer readable medium of claim 15 further including the step of allowing the user to designate a document relevancy factor below which documents will be excluded from further processing.

21. The non-transitory computer readable medium of claim 15 in response to pre-programming, the step of allowing a user to designate preferred key word combinations and having documents containing said combinations segregated during performance of the steps of the search method, subsequently subjecting said documents to the same method steps as all other documents, and separately presenting this group of documents to the user.

* * * * *